(12) United States Patent
Lane et al.

(10) Patent No.: US 7,405,666 B2
(45) Date of Patent: Jul. 29, 2008

(54) METHOD AND APPARATUS FOR LOCATING A MISSING INDIVIDUAL

(75) Inventors: Diana L. Lane, Mosinee, WI (US); Fred P. Lane, Mosinee, WI (US)

(73) Assignee: Safe Assured LLC, Wausau, WI (US)

( * ) Notice: Subject to any disclaimer, the term of this patent is extended or adjusted under 35 U.S.C. 154(b) by 634 days.

(21) Appl. No.: 10/799,174

(22) Filed: Mar. 12, 2004

(65) Prior Publication Data

US 2004/0181676 A1 Sep. 16, 2004

(51) Int. Cl.
*G08B 23/00* (2006.01)
*G05B 19/00* (2006.01)
*H04K 1/00* (2006.01)

(52) U.S. Cl. .......... 340/573.1; 340/5.81; 340/5.83; 340/5.6; 382/115; 713/182

(58) Field of Classification Search .......... 340/573.1, 340/5.81, 5.8, 5.6; 382/115
See application file for complete search history.

(56) References Cited

U.S. PATENT DOCUMENTS

| | | | |
|---|---|---|---|
| 5,101,970 A | 4/1992 | Turner | |
| 5,211,286 A | 5/1993 | Turner | |
| 5,457,747 A | 10/1995 | Drexler et al. | |
| 5,467,403 A | 11/1995 | Fishbine et al. | |
| 5,513,272 A | 4/1996 | Bogosian, Jr. | |
| 5,597,182 A | 1/1997 | Reber | |
| 5,787,186 A | 7/1998 | Schroeder | |
| 5,793,881 A | 8/1998 | Stiver et al. | |
| 5,805,719 A | 9/1998 | Pare, Jr. et al. | |
| 5,907,149 A | 5/1999 | Marckini | |
| 5,978,493 A | 11/1999 | Kravitz et al. | |
| 5,986,746 A | 11/1999 | Metz et al. | |
| 6,018,739 A | 1/2000 | McCoy et al. | |
| 6,023,522 A | 2/2000 | Draganoff et al. | |
| 6,034,605 A | 3/2000 | March | |
| 6,042,005 A | 3/2000 | Basile et al. | |
| 6,072,891 A | 6/2000 | Hamid et al. | |
| 6,079,621 A | 6/2000 | Vardanyan et al. | |
| 6,213,403 B1 | 4/2001 | Bates, III | |
| D456,840 S | 5/2002 | Vachon | |
| 6,381,891 B1 | 5/2002 | Hazel | |
| 6,651,892 B2 | 11/2003 | Hooglander | |
| 6,678,822 B1 | 1/2004 | Morar | |
| 7,005,170 B1 | 2/2006 | Simpson | |
| 7,085,931 B1 | 8/2006 | Smith | |
| 2003/0097351 A1* | 5/2003 | Rothschild et al. ............. 707/1 |

* cited by examiner

*Primary Examiner*—Donnie L Crosland
(74) *Attorney, Agent, or Firm*—Lane Patents LLC; Fred Lane

(57) ABSTRACT

A method and apparatus for identifying a missing person, in particular, a missing child, includes utilizing a CD or other electronic storage medium to store unique identifying indicia of the person, portions of which are encrypted to protect sensitive information and to make it accessible only to authorities having been given a decryption key in advance. The CD or other storage medium is held by the legal guardian of the person, i.e. child, and given to authorities only if the child goes missing. Sensitive personal information is never centrally stored in a database. A kit, including the CD, may also include a conventional photo ID card of the child and, optionally, a booklet of instructions to the parent or other legal guardian.

19 Claims, 3 Drawing Sheets

Kit Deployment
in Missing Individual Search

METHOD AND APPARATUS FOR LOCATING A MISSING INDIVIDUAL

FIELD OF THE INVENTION

This invention pertains to searching for missing persons and to identification aids to assist authorities in such searches. More specifically, the invention pertains to an electronic personal identification device as well as the methods by which information contained on the device is gathered, stored and deployed. This invention is intended to instantly provide key information to authorities for use in solving disappearance cases and to maximize the mobilization for missing person searches.

BACKGROUND OF THE INVENTION

Missing persons searches are certainly not new to our society. In the past, sketches or black and white photographs of missing persons were posted in public places to enlist the public's awareness and aid. Such postings often bore crude likenesses of the individual sought and thus increased the chances that a mistaken identification be made or, worse yet, the subject under search not being identified at all. Multiple copies of the likeness, made for the purpose of increasing viewership, decreased the quality of the image even further. Broadening the geographical boundaries of a search required the likeness to be transported physically—a time-consuming endeavor.

As technology has advanced, other means have become available. Mass mailings, radio, television, and the Internet have played significant roles in disseminating information to the public about missing persons.

The power of the internet to disseminate information to the public, can also be one of its greatest weaknesses when considering how to store data for missing people searches. The media is replete with instances where information that is intended to be private in databases is hacked into, misappropriated and exploited.

Also, the information itself (photographs, fingerprints, DNA samples) must be gathered, transported, and converted to electronic format before it can be broadcast using advanced means, such as the Internet. Precious time is lost in this complex process. Also information is many times incomplete when gathered after the disappearance of the person.

Prior art in the field of missing person identification aids includes three basic products: a paper identification card, various identification bracelets, and identification cards containing biometric data.

On paper identification cards, static, two dimensional, black and white or color still photographs appear, along with a field of personal information and possibly a fingerprint. Examples include a student body card, or driver's license. Such a product does almost nothing to counter the dilemmas already described: paper information must be transported and converted to electronic format before it can be broadcast. Again, time and image quality are compromised.

Identification bracelets are commonly used in hospitals to prevent mistaken identification and, in the case of infants, kidnapping. There are also some parents who require their children to wear bracelets containing the child's name, phone number, and perhaps address. Such a bracelet is useful only if the child is lost and then found by a responsible and benevolent party. One such bracelet is taught by Kravitz et al. U.S. Pat. No. 5,978,493. A kidnapper would likely dispose of the bracelet, rendering it useless in search efforts.

In recent years, an identification card that includes biometric information has been introduced. This product accomplishes two previously problematic objectives: authentication of the card itself, and verification that the holder of the card is truly the one it identifies. Both endeavors require the individual identified to be present. This is apparent in the following patents in this field: Bogosian, U.S. Pat. No. 5,513,272, Fishbine U.S. Pat. No. 5,467,403, Drexler U.S. Pat. No. 5,457,747.

March U.S. Pat. No. 6,034,605 describes a system for storing an individual's personal information for use and dissemination at a time the person goes missing or some other emergency situation arises. The identifying information is entered on a form which is then sealed in a secure package and marked with a unique identifying code. The sealed forms from all persons enrolled in the system are then stored in a centralized location for access and deployment only if someone possessing the identifying code requests access. At that time, a report is generated from the form (or from an electronic storage media which may be used in lieu of the form) and disseminated to the appropriate authorities. The problem with this system is that it requires the person who's information has been gathered or the legal guardian of that person to relinquish custody and control of the identifying information to the operator of the central storage facility. This raises two potential problems, namely, a reluctance on the part of most people to relinquish personal control of such sensitive information, and the need to have a separate central storage facility for all of the individual packages of information.

Another factor involved in these inventions is the highly technical process in which a computer comparison is made between a database of previously obtained biometric information and biometric information gathered at the point of comparison. An algorithmic vector analysis ensues, reducing unique biometrics from a large number of people into a mathematical essence.

In addition to being prohibitive because of its highly technical nature, the objectives of the biometric identification card can only be met in the presence of the individual to whom the card belongs—a useless feature during a missing person search.

The inclusion of biometric data as used in verification, of itself, does not guarantee such information will be useful in helping humans locate a missing person. For example Sagem Morpho, Inc., a world leader in the field of biometric fingerprint identification, states that the templates generated for use in biometric fingerprint systems cannot be used to recreate an image of the fingerprint required in AFIS (called "criminal" by them) applications. See for example, http://www.morpho.com/products/products_biometric_morphotouchfaq.htm.

Thus biometric fingerprint templates used in verifying individuals from a database are useless to a forensic application in the case of identifing fingerprint image. Part of the reason for this approach, beside the fact that the data is unwieldy to maintain, is the concern that the raw fingerprint data is private to an individual unless that right is given up by the individual or usurped by the State.

SUMMARY OF THE INVENTION

The present invention relates to an apparatus and method for identifying a missing individual. Specifically, an electronic identification device in the form of a compact disk, minidisk, Smart Card or any other electronic storage media, stores multiple identification indicia in electronic format, such as likenesses of the subject from various viewpoints (e.g. frontal, profile, rear) and motion, so as to record mannerisms and expressive patterns; an audio file of the subject's voice; a full set of fingerprints; and/or personal information about the subject (place of residence, medical conditions, caregiver details, etc.). The device may contain a still facial likeness of the subject printed on the device itself. The device may also comprise a container for samples from which DNA can be obtained.

In one embodiment, the media comprises (1) an identification field that can include the personal information about the missing person or persons; (2) a digital streaming video; and (3) a means for combining the digital streaming video into electronic CD ROM or other personally held memory, such as a DVD, PDA or Smart Card. The digital streaming video may incorporate multiple cameras; general movement patterns of the subject; a body profile and close-ups of facial features; and a digital streaming audio file of the subject talking. A digital capture of the fingerprints of the subject may also be stored in the information field. The media may also contain hypertexts such that radio buttons can be easily deployed.

The identification device is designed for use in case its owner is missing. Until such time that it is needed, it will remain in the sole possession of or on the person of the subject's guardian or other entity having legal custody (for example in the case of children). Because it is physically secured separate from the subject and not held or entered into a central storage or database, it is not susceptible to hacking attacks. The device therefore lies dormant and in the possession of the subject's legal guardian unless the subject of the card is missing.

Furthermore, extremely sensitive data that is useful only to law enforcement, such as fingerprints, address, phone number, date of birth and medical information, can be secured in the media by encryption. The key for decryption is held only by law enforcement or other appropriate authority. In this way, extremely sensitive data can only be accessed when both elements are present, the decryption key from the law enforcement and the physical card from the holder. Law enforcement agencies have found that, in the period immediately following the report of a missing person, information such as the person's address, phone number and date of birth are not useful in the search. Prior to disclosure, such information could even be used by someone with malicious intent. Therefore, such information, along with fingerprints, are preferably encrypted.

If, in the unfortunate case the subject is missing and the identification device is needed, the information on it can be accessed using any common personal computer or personal data appliance equipped with a media reader, and can be instantly transmitted by the authority to other authorities and news organizations anywhere in the world without loss of clarity or detail.

An embodiment of a method of gathering and storing information for the identification and recovery of a missing person or persons may comprise (1) producing an electronic identification card in the form of electronic memory storage media; (2) capturing in the electronic content of the media unique identifying features of an individual by means of digital devices indicium; and (3) manufacturing the identification card in the form of a CDROM disk or minidisk or personal data device input for distribution to the buyer of the disk. The method may also include printing on the face of the disk a facial image of the subject the disk is commissioned to identify, and general identifying information.

In the event the subject of the identification device is thought to be missing, a method of deployment for the device could be undertaken wherein the holder of the device provides information from the device to authorities either physically or electronically. Authorities could then use information stored on the card to aid in finding the missing person by: (1) alerting the public at large that the missing person is missing; (2) providing the public at large with detailed information regarding the missing person; (3) sending the information immediately to public safety officers in the vicinity through electronic media; and (4) using the information for verification of the subject in the event subject is found.

There are three levels or stages on which the identification device can be an effective tool for finding a missing person.

Stage 1

It is reported that 99% of missing persons cases are solved in the vicinity immediate to where the missing person was last seen. (*US News and World Report,* Aug. 13, 2001). As soon as an individual is thought to be missing, the holder of the device can manually show the card, the face of which displays a still image of the subject, to people in the area.

Stage 2

Once it has been determined that the subject is no longer in the vicinity, the electronic information contained on the device that is not encrypted can be broadly deployed.

Stage 3

If at any time during the investigation forensic details become necessary, information embodied on the device may be useful. For example, DNA can be obtained from the sample held in the device, fingerprint information can be extracted from a scene and be compared with fingerprint images on the device.

The fact that the device is confidentially held addresses the issue of sensitive data, such as forensic fingerprint information mentioned in the prior art discussion above.

Advantages of the identification device are that it is:

a. Private—Once created, the device remains in the possession and control of its owner, not its producer or any third party. The data contained on the device need never be used or even seen unless an emergency arises. No central database is needed to administer or deploy the information contained on the device.

b. Flexible—The device can be manufactured to contain, depending on the requests of the buyer, all or any combination of fields described in this document. Likewise, during a missing person search, any combination of the fields embodied on the media may be utilized.

c. Transportable—When information on the device is needed, it can be easily and universally transported through electronic media.

d. Updateable—Once the device is opened, pertinent search information may be added. For example, possible abductors may be named, or a last known location revealed.

e. Accurate—Because the information is stored digitally without first going through paper medium, there is no loss of quality or detail when it is transported.

f. Thorough—Humans identify humans holistically and in many ways—not just by a static visual image. The device offers recognition clues of various kinds which can include:

i. Facial features seen from multiple viewpoints ii. Full body length views iii. Patterns of movement and expression iv. Voice tone, quality, fluctuation, inflection and accent g. Motivational—By showing animation as part of the missing person's broadcast, the device brings the subject to life in the minds of those doing the search.

h. Forensic—The device provides several types of forensic information for use by authorities which can include:

i. An inclusive set of digital quality fingerprint images—Many child abductions are unsolvable because the child's fingerprints are not available for comparison with prints lifted from alleged abductors' property. Additionally, storing a complete set of fingerprints greatly increases the chances a match can be made.

ii. A digital quality voice recording—In ransom situations, such a recording would be useful for comparison purposes.

iii. A DNA sample—The container located in the device can hold DNA-containing material such as a lock of hair or nail clipping.

i. Immediate positive verification—If a person suspected of missing is found authorities will want to make a positive identification immediately. This can be done by using traditional AFIS matching algorithms for verification between the fingerprint stored on the media, and the live capture.

j. Versatile—The device is useful in a wide variety of situations, which can include but not limited to:

i. Child abduction by strangers
    ii. Child abduction by family
    iii. Lost or runaway children
    iv. Adults missing from home or domicile
    v. Missing international or domestic travelers
    vi. Escapees from corrections institutions
    vii. Parole violators
    viii. Alzheimer's or other mental illness patients k. Expandable—Other forms of identification or biometric means may be added. Examples include:

i. Facial thermography
    ii. Automatic facial identification
    iii. Three dimensional or holographic imaging.

In accordance with the presently preferred embodiment, the method of the present invention includes the steps of (1) providing a portable electronic storage medium on which is stored unique identifying indicia of a person, (2) encrypting selected portions of the stored indicia, (3) giving the medium to an entity having legal custody of the person, and (4) providing said medium and a decryption key to an investigative authority for disbursement of portions of said indicia should the person go missing. In a variant method of the present invention, the steps comprise (1) storing on an electronic storage medium physical indicia of a person including a digital streaming video of the person and a digital recording of the voice of the person, (2) retaining the storage medium separate from the person and separate from a centralized storage facility, and (3) utilizing the storage medium to deliver the indicia to the authority should the person go missing.

One embodiment of the apparatus of the present invention comprises an electric storage medium containing unique identifying physical indicia of the individual, means for encrypting selected portions of the stored indicia, and means for formatting the storage medium to enable direct entry of the stored indicia into an electronic communication system of an investigative authority. In another embodiment of the apparatus, there is included an electronic storage medium containing physical indicia of a person, including a digital streaming video and a digital recording of the voice of the person, and a format for said storage medium enabling direct electronic communication of the indicia to an investigative authority should the person go missing.

A further embodiment of the method of the present invention comprises the steps of (1) providing to the legal guardian of a child a kit including a picture ID card of the child and a CD storing unique identifying indicia of the child including encrypted forensic indicia, (2) utilizing the picture ID to begin a stage 1 search should the child go missing, (3) utilizing the CD to initiate a stage 2 search, if necessary, to electronically disseminate certain identifying indicia to an investigative authority, and (4) utilizing a previously supplied decryption key to initiate a stage 3 search, if necessary, to electronically disseminate certain encrypted forensic indicia to an investigative authority.

Further objects and advantages of the identification device will become apparent upon consideration of the drawings and ensuing descriptions.

The foregoing has outlined rather broadly the features and technical advantages of the identification device so that those skilled in the art may better understand the detailed description that follows.

DETAILED DESCRIPTION OF THE PREFERRED EMBODIMENT

The presently preferred embodiment of the method and apparatus of the subject invention will be described with respect to how the identifying personal information is gathered, entered and stored; and how the storage media may be used to deploy the personal identifying information in a typical missing person search, such as a missing child.

Figure 1:
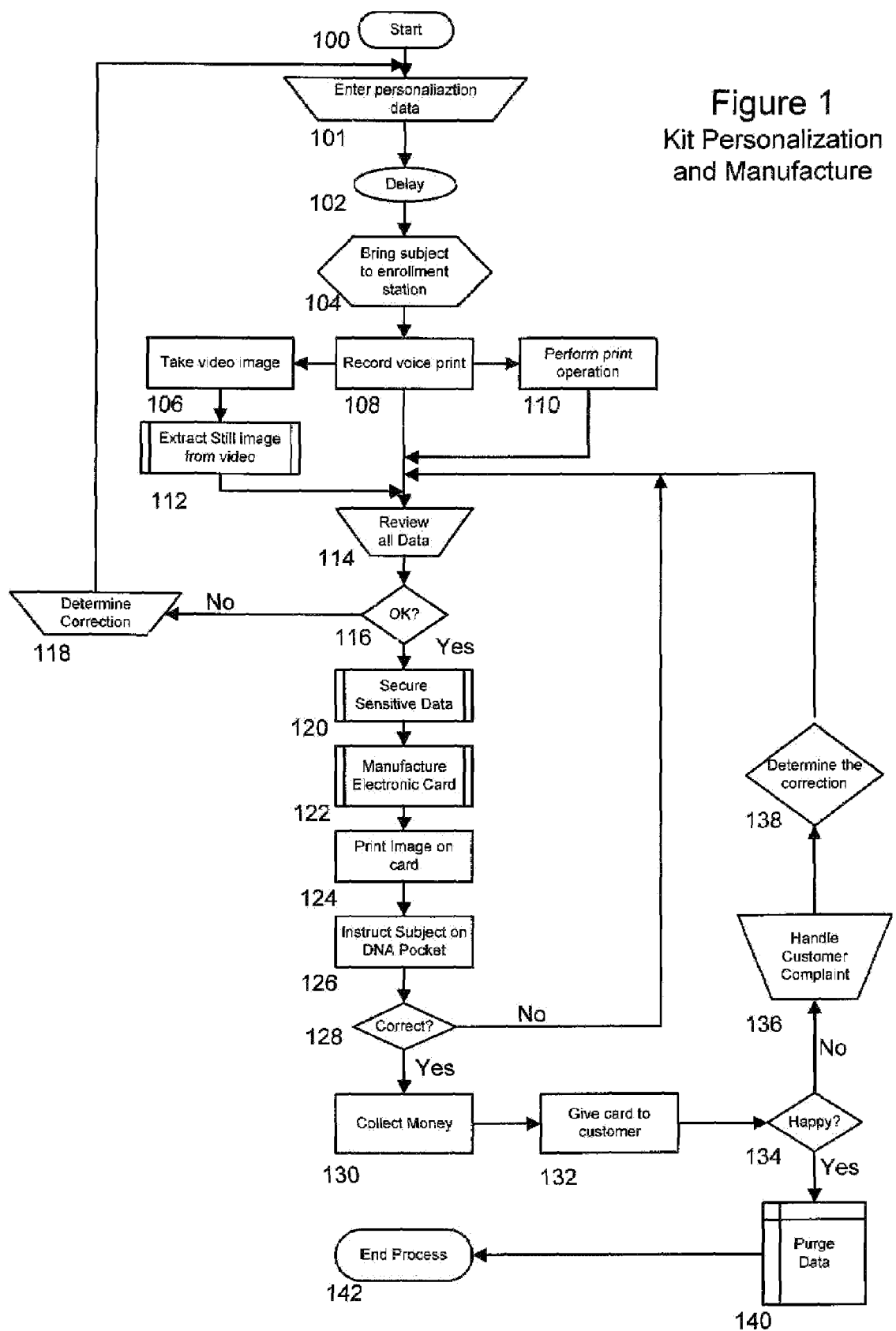
FIG. 1 shows a flow diagram on how the identification device is made.

Referring to FIG. 1, it is anticipated that the subject invention will be implemented in a small, easily stored kit that will include an identification card, a CD or other storage medium containing personal identification information that is stored digitally, and a booklet describing to the holder of the kit how the information should be deployed, if necessary. It is anticipated that, with respect to the enrollment of minor children in the identification system of the present invention, a location such as a school would provide an ideal vehicle for implementation.

In FIG. 1, at step 101, personal information for the child is collected, possibly provided by the parent or guardian, including name, address, height, weight, sex, birth date, hair color, eye color, guardian's name, date of issue, distinguishing marks, medical details such as allergies, medications or the like, and other pertinent comments. All this information can be entered into a pull-up form on a CRT. At step 104, the child is directed to an enrollment station where, at step 108, a streaming audio of the child speaking is made. At step 110, a full set of digital fingerprints is produced, and at step 106 a streaming video of the child is taken that shows important characteristics such as movement and gait with both close-up and distant shots. This provides life-like qualities of the child that no still picture can provide. At step 112, a still image is extracted from the video which can be placed on a separate identification card forming part of the kit and also on the storage medium such as the CD on which all of the digital information is stored.

When the entered data has been reviewed and found satisfactory, sensitive data is encrypted so that, subsequently, it cannot be retrieved from the CD or other storage medium without a key. Sensitive data that is useful only to law enforcement, and equally importantly, must be guarded against misappropriation by anyone with malicious intent, includes the fingerprints, address, phone number, date of birth and medical information. The CD is then made and, as another part of the kit, a conventional plastic laminated ID card may be created. The ID card would include a digital still color photo of the subject (extracted from the streaming video), printed indicia such as name, height, weight, sex, birth date, and hair and eye color. The printed ID may be useful in the early stage of a child's disappearance where the parent or other guardian possessing the kit can show the ID card and picture to people in the area.

At step 126, the subject or the subject's parent or guardian can be instructed on how to collect and place in a jacket pocket on the kit a sample for retrieval of DNA.

When the enrollment process is complete, at step 134, the kit including the digital storage medium, the plastic identification card and instruction book are given to the parent or guardian and all data collected is purged from the system at step 140. Obviously, multiple kits could be made for another parent, grandparents or the like.

Figure 2:
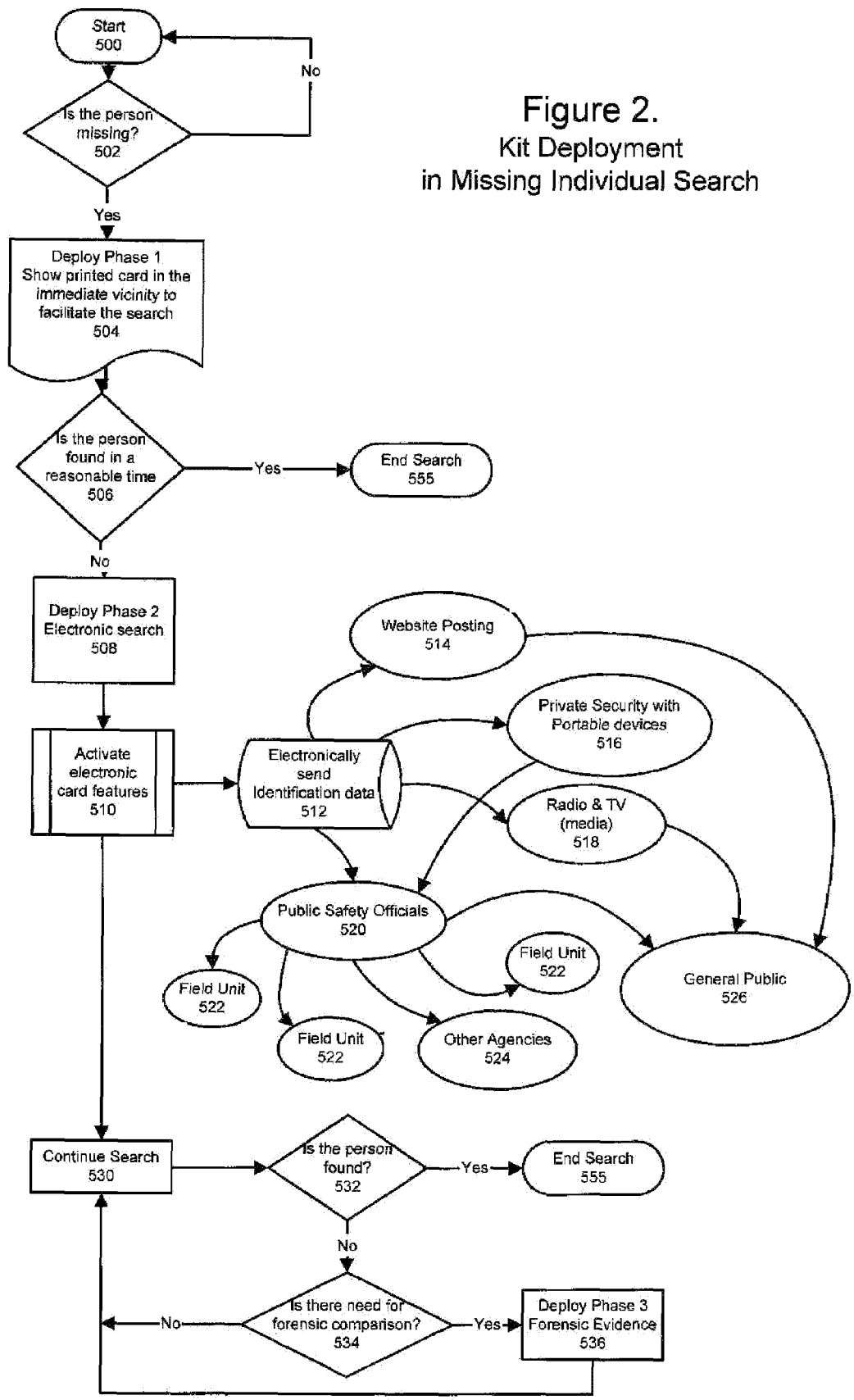
FIG. 2 shows a flow diagram on how the identification device is used.

Referring to FIG. 2, if the child is thought initially to be missing at step 502, phase 1 of system deployment begins at step 504 where the printed ID card, bearing the subject's photo, can be shown in the immediate vicinity. If the child is found in a reasonable time, such as is the case in about 99% of the cases of missing children, the search is simply ended.

If the child is not found, phase 2 is deployed at step 508 where the CD is activated to deploy the stored digital information (step 510). All non-sensitive (unencrypted) data including the streaming video, streaming audio, and other physical identifying information may be deployed electronically with any personal computer, either by the owner and holder of the CD or by public or private safety and security officials, as shown at step 512 at seq. All non-sensitive information can be deployed rapidly and in different formats for broad dissemination anywhere in the world, if necessary.

If, as the search continues, there is found a need for forensic comparison information, phase 3 is deployed at step 536. This information, such as the digital finger prints, has been encrypted as previously described and a key is necessary to make the data available. Because the key is held by law enforcement (and supplied to law enforcement ahead of time), the encrypted data is deployed only when and if necessary and then only by law enforcement or similar authority.

Figure 3:
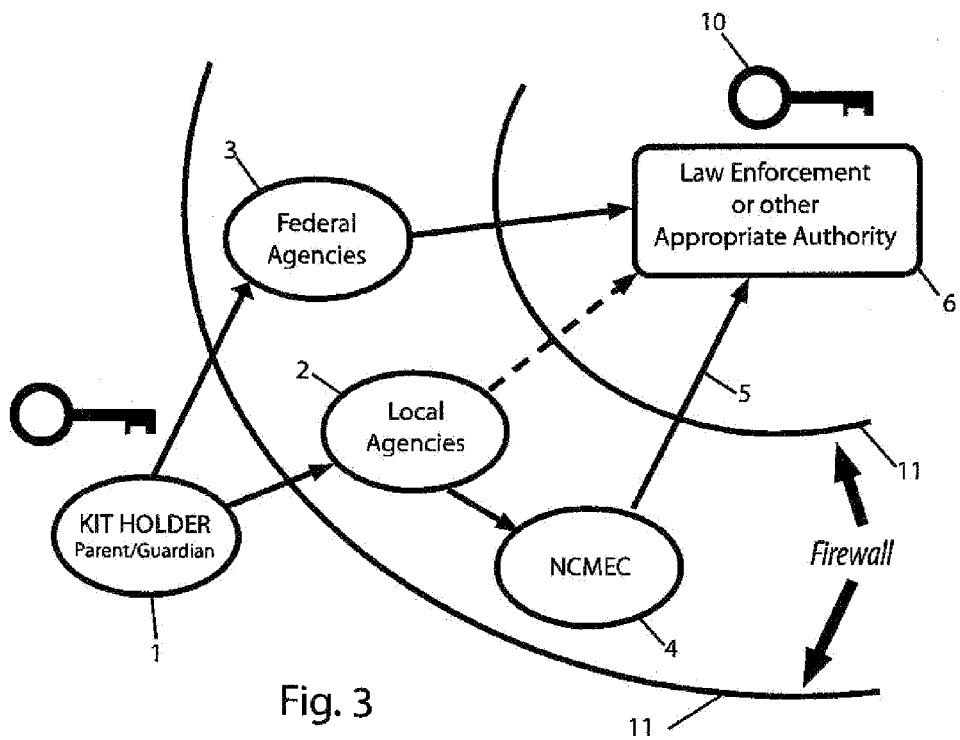
FIG. 3 is a schematic representation of how information stored on the identification device is deployed by the holder.
Figure 4:
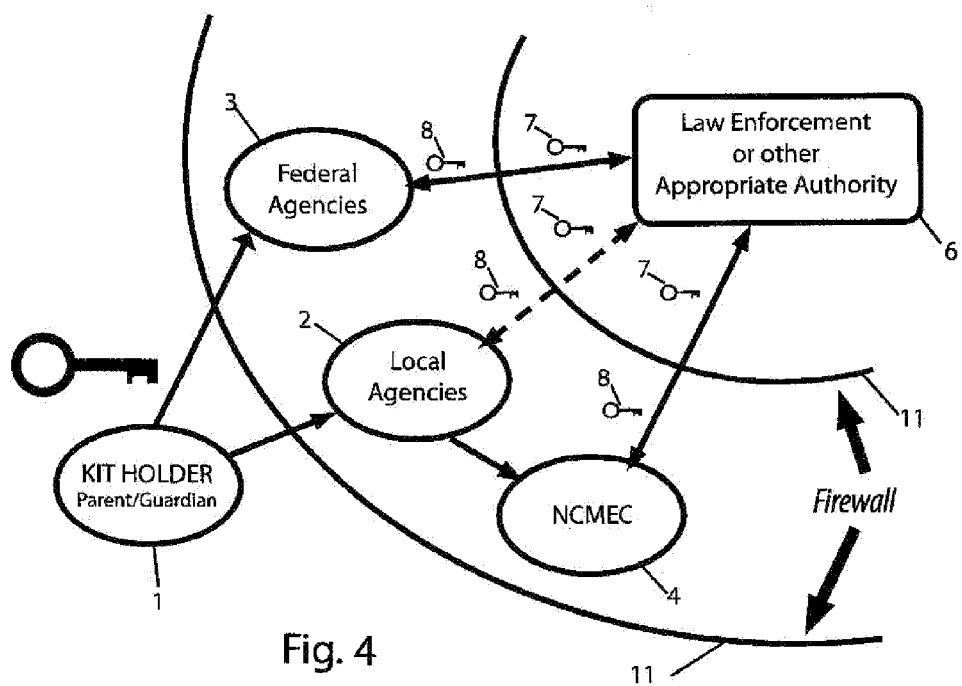
FIG. 4 is a schematic representation of how all data including encrypted information is further deployed.

Referring now to FIGS. 3 and 4, if it is found necessary to implement the stage 2 deployment, the kit holder 1 (e.g. parent or guardian of the missing child) transmits the information on the CD or physically gives the CD to a local law enforcement agency 2 or a federal law enforcement 3. In the latter case, federal agencies are connected directly to the FBI National Crime Investigation Center (NCIC) which is the holder of the key 10 to unlock and deploy in usable form all encrypted information. Although certain local law enforcement agencies 2 may have this capability, many do not and many also utilize data formats that are not compatible with the federal NCIC system.

It is an important feature of the subject invention to provide all stored digital data in XML format which is the format currently used by NCIC, the FBI and all other Justice Department agencies. However, it is also important to have a standard report form to automate and speed up the deployment of the information. The National Center for Missing or Exploited Children (NCMEC) has been created to, among other things, fill this void and provide standardization in the gathering and dissemination of information relating to the search for and location of missing or exploited children. Federal law (National Child Search Assistance Act of 1990) now requires that the report of a missing child (i.e. deployment of phase 2 at 508 in FIG. 2) be reported to NCIC without delay. Obvious, the more quickly such information is reported to NCIC, the more quickly the information can be broadly disseminated back to all interested investigative and law enforcement bodies and to the public at large.

Thus, if at the time the information on the CD is given by the CD holder 1 to the local agency 2 (FIG. 3), the local agency is not capable of transmitting the information directly to NCIC in an XML format and using the data structures required, the local agency may utilize the facilities of NCMEC 4 where the information stored on the CD is used to populate the form in formats utilized by NCMEC. For example, NCMEC utilizes different report formats depending on the nature and circumstances of the missing child, i.e. disability, endangered, involuntary, juvenile runaway, or disaster victim. If, for example, the child has gone missing because of a suspected kidnapping (i.e. involuntary), the NCMEC system has a special logic tree which is different from the other categories. Suspects may be involved, as well as a vehicle with certain known identifying information (model, license number, color, etc.). NCMEC provides the function of a clearinghouse and facility for cleaning up data received from local agencies, putting the data into a standard format and transmitting it directly to NCIC, as shown at 5 in FIG. 3.

Referring also to FIG. 4, NCIC generates a missing person file at 6 and, utilizing its own proprietary encryption/decryption system identified by the keys 7 and 8, disseminates the missing person file to federal agencies 3, local agencies 2 and NCMEC 4 as necessary. This enables broad and rapid dissemination of the non-sensitive identifying information and also permits local agencies to access the stage 3 encrypted data, if necessary.

Once all of the information on the CD is given or transmitted by the kit holder 1 to a local 2 or federal 3 agency, the link to the CD holder (parent or guardian) is severed. In addition, all of the data transmission systems are provided with appropriate firewalls 11 to prevent entry by hackers or others having no need or right to access the information.

We claim:

1. A method of forming an ID kit having contents comprising personal information and unique identifying indicia for locating a missing subject, whereby the contents of said kit is retained separately from the subject and from a centralized storage facility, comprising the steps of:

providing a means for interfacing with a portable electronic storage medium;

forming personal information about said subject on said portable storage medium;

forming unique identifying indicia of said subject on said portable storage medium;

forming a software program on said portable storage medium that will function as a kit which is independent of said means for interfacing;

purging the contents formed on said kit from said means for interfacing.

2. The method as set forth in claim 1 wherein said identifying indicia includes at least one of a personal information field, a photo, a streaming video, a voice recording, and fingerprints.

3. The method as set forth in claim 2 wherein the means for interfacing with said storage medium comprises computer.

4. The method as set forth in claim 2 wherein the storage medium includes at least one of a CD-ROM, a compact disk, a mini disk, a smart card, or any other electronic storage medium.

5. The method as set forth in claim 4 wherein selected portions of said identifying indicia is encrypted.

6. The method as set forth in claim 5 wherein said kit is given to and retained by an entity having legal custody of said subject.

7. The method as set forth in claim 5 wherein a means for decryption is provided to an appropriate authority for deployment of selected portions of said indicia; whereby a means for decryption is retained separately from the entity having legal custody of said subject.

8. The method as set forth in claim 5 wherein the encrypted indicia includes at least one of; fingerprints, date of birth, social security number, residence, medical conditions, and private or personal data.

9. The method as set forth in claim 2, wherein said ID device includes a program to update contents of said kit.

10. A method for providing a kit containing personal information to a third entity for use in locating a missing subject, comprising the steps of;
    storing digital physical indicia of the subject on an electronic storage medium in a data format for direct computer dissemination;
    encrypting portions of the data;
    giving possession of the storage medium to a second entity which is separate from, but associated with, the subject;
    providing a means for an authority, with no prior association with the subject or the second entity, to decrypt portions of said data;
    said means for decryption being prepared in advance of dissemination; and,
    utilizing the electronic storage medium to deliver the data to said authority.

11. An apparatus for enrollment of identification data for production of an ID kit of a subject comprising;
    a means for entering personal information and identifying indicia of said subject;
    a means for recording a likeness of said subject;
    a means for purging identification data upon completion of enrollment; and,
    an apparatus for storing said personal information and said likeness on an electronic memory storage media such that said electronic memory storage media retains said identification data after being purged from said apparatus for enrollment.

12. An apparatus for enrolling identifying data of a subject as in claim 11 wherein said means for entering said personal information, and said means for recording said likeness of said subject, is a computer.

13. An apparatus for use by an appropriate authority having a centralized database to assist a parent or a guardian in locating and identifying a missing subject comprising:
    a kit comprising an electronic storage medium containing unique identifying indicia of the subject which is stored only in the kit;
    means for encrypting selected portions of the stored indicia; and
    means for formatting said storage medium to enable direct entry of the stored indicia from the storage medium into an electronic communication system of the authority; such that said unique identifying indicia is not found in the centralized database prior to being provided by a parent or a guardian.

14. The apparatus as set forth in claim 13 wherein the electronic communication system includes an email.

15. The apparatus as set forth in claim 13 wherein the electronic communication system includes broadcast media.

16. A method for providing a key for decrypting personal information to an appropriate authority for use in identifying a missing subject as part of a missing subject search comprising;
    providing a kit comprising electronic storage medium storing digital physical indicia of the subject in a data format for direct computer dissemination,
    encrypting portions of the data; and,
    providing a means for decrypting said encrypted portions; whereby said key is delivered to the authority in advance of dissemination of said data.

17. A method for organizing a search for a missing individual, having stages of escalation during the search, comprising the steps of:
    providing a guardian of the individual a kit including a picture ID card of the individual and an electronic storage media comprising unique identifying indicia of the individual including encrypted forensic indicia;
    utilizing the picture ID to begin a stage one search should the individual go missing;
    utilizing the electronic storage media to initiate a successive search, if necessary, to electronically disseminate certain identifying indicia to involved third parties; and,
    utilizing a decryption key to initiate a successive search, if necessary, to electronically disseminate certain encrypted indicia of a forensic or private nature to an appropriate authority.

18. The method as set forth in claim 17 including the step of providing at least one of a streaming video and a streaming audio of the individual as part of the stored indicia.

19. The method as set forth in claim 17 including the step of providing a set of digital fingerprints of the individual as part of the encrypted forensic indicia.

* * * * *